United States Patent Office 3,313,868
Patented Apr. 11, 1967

3,313,868
ETHYLENE-PROPYLENE RUBBERS CONTAINING VINYL AROMATIC HYDROCARBON - ALKYL ACRYLATE COPOLYMER
George B. Freda, Belpre, Ohio, assignor to Borg-Warner Corporation, Chicago, Ill., a corporation of Illinois
No Drawing. Filed Oct. 23, 1961, Ser. No. 147,045
6 Claims. (Cl. 260—897)

The present invention relates to compositions comprising blends of a major proportion of ethylene-propylene rubber with a minor proportion of resinous copolymer of a vinyl aromatic hydrocarbon and an ester of acrylic acid.

The addition of minor proportions (5 to 30 parts by weight) of the resinous copolymer to ethylene-propylene rubbers substantially aids in the processability of the rubber and also increases the hardness, modulus and tear resistance of the rubber.

The resinous copolymer is obtained by polymerizing a mixture of a vinyl aromatic hydrocarbon and an ester of acrylic acid. The preferred vinyl aromatic hydrocarbon is styrene. However, the styrene may be replaced, entirely, or in part, by other vinyl aromatic hydrocarbons, such as vinyl toluenes. The preferred ester of acrylic acid for the present copolymer is 2-ethylhexyl acrylate. The preferred ester may be replaced entirely, or in part, by other esters of acrylic acid in which the alkyl chain contains from 2 to 10 carbon atoms. The 2-ethylhexyl acrylate may be replaced, for example, by ethyl acrylate, n-butyl acrylate, and the like. The preferred resinous copolymer is made by polymerizing 90 parts by weight styrene with 10 parts by weight 2-ethylhexyl acrylate. As above pointed out, other monomers may be employed in making the copolymer and the ratio of monomers is preferably between about 5 and 20 parts by weight of the ester of acrylic acid to about 95 to 80 parts by weight of the vinyl aromatic hydrocarbon. The resinous copolymer may contain small amounts (preferably not more than 3 parts per 100 parts resinous copolymer) of other ingredients. Example of these other ingredients are isoprene, methacrylic acid, vinylidene chloride, carbon tetrachloride, n-methylolacrylamide, divinyl benzene, and the like.

The addition of the resinous copolymer to ethylene-propylene rubber aids in the processability thereof and also increases the hardness, modulus, and tear resistance of the rubber. Ethylene-propylene rubbers are prepared by copolymerizing ethylene and propylene to molecular weights between 100,000 and 1,000,000. The propylene content of the copolymer should be greater than 25 mole percent yield of true elastomer with the preferred range being 33–50 mole percent. Small amounts (1–2%) of other monomers, such as butadiene, isoprene, butylene, non-conjugated dienes, or combinations thereof, may be polymerized with the ethylene and propylene.

The present invention is better illustrated by the following examples wherein all parts are expressed by weight.

Example 1

150 parts of water and 3 parts of sodium stearate were charged in a stirred glass reactor heated to 60° C. A mixture of 90 parts styrene and 10 parts 2-ethyl hexyl acrylate containing 0.5 part of mixed tertiary mercaptans ($C_{12}$—60%; $C_{14}$—20%; $C_{16}$—20%) was added continuously over a two-hour period to the soap solution. Fifty parts of water containing 0.5 potassium persulfate was added continuously to the stirred reactor over an additional two-hour period. The reaction was allowed to continue at 60° C. for an additional one hour at which time a 1% phosphoric acid solution was added to the resulting latex to coagulate the polymer. The coagulated polymer was washed with water and dried in an oven at 45° C. for approximately 48 hours.

The first three of the following ingredients of runs A–I inclusive were mixed in a Banbury type mixer at a temperature of 300° F. for six minutes and the last three ingredients, when used, were added to the resultant blend on a cold two roll mill. Each blend was cured for 15 minutes in a press at 320° F. All portions are in parts by weight.

TABLE I

| | Run | | | | | | | | |
|---|---|---|---|---|---|---|---|---|---|
| | A | B | C | D | E | F | G | H | I |
| 1. Ethylene/propylene copolymer (equimolar amounts) | 100 | 90 | 85 | 80 | 75 | 100 | 85 | 100 | 85 |
| 2. Styrene/2-ethylhexyl acrylate copolymer (as prepared above) | 0 | 10 | 15 | 20 | 25 | 0 | 15 | 0 | 15 |
| 3. Dicumyl Peroxide (40%) | 10 | 10 | 10 | 10 | 10 | 10 | 10 | 10 | 10 |
| 4. Sulfur | 1 | 1 | 1 | 1 | 1 | | | 2 | 2 |
| 5. p-Quinone Dioxime | | | | | | | | 2 | 2 |
| 6. Red lead ($Pb_3O_4$) | | | | | | | | 10 | 10 |
| | Physical properties | | | | | | | | |
| Tensile strength, p.s.i., 73° F | 350 | 350 | 550 | 580 | 500 | 260 | 370 | 310 | 420 |
| Elongation, percent, 73° F | 700 | 700 | 800+ | 725 | 800 | 700 | 700 | 800+ | 800+ |
| 100% Modulus, p.s.i. | 80 | 120 | 140 | 180 | 100 | 90 | 150 | 80 | 110 |
| 200% Modulus, p.s.i. | 110 | 150 | 150 | 180 | 100 | 110 | 180 | 105 | 130 |
| 300% Modulus, p.s.i. | 120 | 170 | 160 | 180 | 100 | 120 | 200 | 120 | 140 |
| Hardness, Shore A | 36 | 43 | 48 | 53 | 57 | 38 | 47 | 36 | 45 |
| Tear, lb./in. | 50 | 80 | 60 | 80 | 80 | 50 | 70 | 50 | 60 |

Example 2

In order to determine the effect of the present resinous copolymer on filled ethylene-propylene rubber, the resinous copolymer of Example 1, ethylene-propylene rubber (equimolar amounts), and fillers (carbon black and silica)

were blended. The blend was cured for 30 minutes at 320° F. and had the following physical properties:

TABLE II

| | Run | | | |
|---|---|---|---|---|
| | A | B | C | D |
| 1. Ethylene/Propylene copolymer | 100 | 85 | 100 | 85 |
| 2. Styrene/2-ethylhexyl acrylate copolymer | | 15 | | 15 |
| 3. Silica | 58.5 | 58.5 | | |
| 4. Carbon black | | | 50 | 50 |
| 5. Dicumyl peroxide | 4 | 4 | 4 | 4 |
| 6. Sulfur | 1 | 1 | 1 | 1 |
| Tensile strength, p.s.i., 73° F | *1,890 | 1,950 | 2,670 | 2,100 |
| Elongation, percent, 73° F | 800+ | 675 | 450 | 400 |
| 100% Modulus, p.s.i | 260 | 340 | 290 | 450 |
| 200% Modulus, p.s.i | 330 | 440 | 900 | 950 |
| 300% Modulus, p.s.i | 390 | 570 | 1,580 | 1,600 |
| Hardness, Shore A | 77 | 85 | 60 | 69 |
| Tear, lb./in | 240 | 230 | 220 | 220 |
| Lupke Rebound, percent | 65 | 60 | 67 | 67 |

*No Break—Modulus at 800% Elongation.

Ingredients other than those aforementioned which conventionally may be added to rubbers may be added to the reinforced rubbers of the present invention without destroying the effects obtained by using the present resinous copolymer. Examples of such ingredients are pigments, fillers, plasticisers, and the like.

The addition of the resinous copolymer to the ethylene-propylene rubber provides a material which has higher tensile, elongation, moduli, hardness and tear strength than the rubber per se.

It has also been found that addition of the resinous copolymer to the ethylene-propylene rubber, filled and unfilled, reduces the viscosity of the rubber at 250° F. resulting in better flow, suggesting good moldability and extrusion. Also, shrinkage and sticking was reduced by the resin.

The reinforced rubbers of the present invention find their field of greatest usefulness in the fabrication of mechanical goods such as electrical insulation, flooring, shoe soles, gaskets, and the like.

While this invention has been described in connection with certain specific examples thereof, these examples are illustrative only and are not to be considered limitations on the spirit or scope of said invention except insofar as these may be incorporated in the appended claims.

I claim:

1. A composition comprising from about 95 to about 70 parts by weight of (a) an ethylene-propylene rubber and correspondingly from about 5 to about 30 parts by weight of (b) a copolymer of (1) a vinyl aromatic hydrocarbon and (2) an alkyl ester of acrylic acid in which the alkyl chain contains 2 to 10 carbon atoms.

2. A composition comprising from about 95 to about 70 parts by weight of (a) an ethylene-propylene rubber and correspondingly from about 5 to about 30 parts by weight of (b) a copolymer of (1) an aromatic hydrocarbon selected from the group consisting of styrene and vinyl toluene and (2) an alkyl ester of acrylic acid in which the alkyl chain contains 2 to 10 carbon atoms.

3. A composition comprising (a) from about 95 to 70 parts by weight of an ethylene-propylene rubber and (b) correspondingly, from about 5 to 30 parts by weight of a copolymer of (1) from about 95 to 80 parts by weight of a vinyl aromatic hydrocarbon and (2) correspondingly from about 5 to 20 parts by weight of an alkyl ester of acrylic acid in which the alkyl chain contains 2 to 10 carbon atoms.

4. A composition comprising (a) from about 95 to 70 parts by weight of an ethylene-propylene rubber and (b) correspondingly, from about 5 to 30 parts by weight of a copolymer of (1) from about 95 to 80 parts by weight of an aromatic hydrocarbon selected from the group consisting of vinyl toluene and styrene and (2) correspondingly, from about 5 to 20 parts by weight of an ester of acrylic acid selected from the group consisting of ethyl acrylate, butyl acrylate, and 2-ethylhexyl acrylate.

5. A composition comprising (a) from about 95 to 70 parts by weight of an ethylene-propylene rubber and (b) correspondingly, from about 5 to 30 parts by weight of a copolymer of (1) styrene and (2) 2-ethylhexyl acrylate.

6. A composition comprising (a) from about 95 to 70 parts by weight of an ethylene-propylene rubber and (b) correspondingly, from about 5 to 30 parts by weight of a copolymer of (1) from about 95 to 80 parts by weight of styrene and (2) correspondingly, from about 5 to 20 parts by weight of 2-ethylhexyl acrylate.

References Cited by the Examiner

UNITED STATES PATENTS

| 2,282,002 | 5/1942 | Scott et al. | 260—4 |
| 2,963,452 | 12/1960 | Sinn et al. | 260—4 |
| 3,230,186 | 1/1966 | Kreibich et al. | 260—4 |

MURRAY TILLMAN, *Primary Examiner.*

W. H. SHORT, G. LESMES, N. W. SHUST,
*Assistant Examiners.*